(12) United States Patent
Babcock (10) Patent No.: US 6,352,271 B1
(45) Date of Patent: Mar. 5, 2002

(54) CYLINDER FOR IMPROVING THE HANDLING OF A VEHICLE IN TURNS

(76) Inventor: Daniel A. Babcock, 327 N. Kalamazoo St., Marshall, MI (US) 49068

( * ) Notice: Subject to any disclaimer, the term of this patent is extended or adjusted under 35 U.S.C. 154(b) by 0 days.

(21) Appl. No.: 09/614,708

(22) Filed: Jul. 12, 2000

(51) Int. Cl.$^7$ ............................. B60G 7/00; F16F 5/00
(52) U.S. Cl. ......................... 280/124.1; 280/124.106; 280/124.116; 280/124.128; 267/124; 267/64.12; 267/64.15; 188/282; 188/287
(58) Field of Search ...................... 280/64.12, 124.1, 280/124.106, 124.116, 124.128, 124.153, 5.58, 5.522; 267/124, 64.15, 287; 188/287, 282, 317, 322

(56) References Cited

U.S. PATENT DOCUMENTS

| 2,141,541 A | | 12/1938 | Levy |
| 2,397,640 A | | 4/1946 | Bingham |
| 2,823,915 A | | 2/1958 | Bourier deCarbon |
| 3,110,485 A | | 11/1963 | Axthammer |
| 3,706,362 A | | 12/1972 | Faure |
| 3,778,187 A | * | 12/1973 | Wennberg ................. 267/64.12 |
| 3,780,622 A | * | 12/1973 | Vogel ........................... 267/64 |
| 3,798,744 A | * | 3/1974 | Smith ........................... 267/64 |
| 3,874,485 A | * | 4/1975 | Smith ........................... 267/64 |
| 4,131,139 A | | 12/1978 | Tanabe |
| 4,257,499 A | * | 3/1981 | Deschner .................... 188/287 |
| 4,405,119 A | | 9/1983 | Masclet et al. |
| 4,534,545 A | * | 8/1985 | Fannin et al. ............. 267/64.24 |
| 4,771,604 A | * | 9/1988 | Nakano .................... 267/64 X |
| 4,791,712 A | * | 12/1988 | Wells et al. .............. 267/64 X |
| 4,934,667 A | * | 6/1990 | Pees et al. ................ 267/64 X |
| 5,386,893 A | * | 2/1995 | Feigel .................... 188/287 X |
| 5,727,931 A | * | 3/1998 | Lash et al. .............. 188/297 X |
| 5,860,497 A | * | 1/1999 | Takahashi ................... 188/314 |
| 5,887,857 A | * | 3/1999 | Perrin ..................... 267/24.12 |
| 5,975,129 A | * | 11/1999 | Williams ................ 188/297 X |

FOREIGN PATENT DOCUMENTS

| DE | 2221945 | * | 5/1972 | ................. 267/64 |
| GB | 864703 | * | 7/1959 | ............. 267/64.12 |

* cited by examiner

Primary Examiner—Lanna Mai
Assistant Examiner—Toan C To
(74) Attorney, Agent, or Firm—Mary M. Moyne; Ian C. McLeod (57) ABSTRACT

A hydraulic and pneumatic cylinder (10) for use on a vehicle (100) to improve the handling of the vehicle in a turn or curve. The cylinder repositions the rear wheel (108) of the vehicle in response to a change in the speed of the vehicle. When the vehicle enters a turn and decelerates, the piston of the cylinder moves to the extended position. When the vehicle exits the turn and accelerates, the piston of the cylinder moves to the compressed position.

32 Claims, 6 Drawing Sheets

CYLINDER FOR IMPROVING THE HANDLING OF A VEHICLE IN TURNS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION (1) Field of the Invention

The present invention relates to a combination hydraulic and pneumatic cylinder which has a valve in the piston to control the rate of movement of the piston. In particular, the present invention relates to a combination hydraulic and pneumatic cylinder for use in controlling the handling of a vehicle around curves. The cylinder controls the movement of at least one of the rear wheels of the vehicle during cornering.

(2) Description of the Related Art

The related art has shown various pneumatic, hydraulic and olepneumatic cylinders using a variety of different constructions to control the movement of the piston of the cylinder. In particular, the related art shows cylinders where a bore is provided through the piston rod to allow fluid to move between chambers of the cylinder through the piston rod. Illustrative are U.S. Pat. Nos. 3,110,485 to Axthammer and 4,405,119 to Masclet et al.

Axthammer shows a hydro-pneumatic suspension device. The device includes a hollow shell with a cavity having a transverse partition dividing the cavity into a storage space and a pressure space. The free end portion of the plunger is located in the pressure space. The plunger has an axial cavity which extends over a major portion of the plunger length. The cavity is in fluid communication with the storage space. An elongated open groove is formed in the outer surface of the plunger near its inner end portion. The groove forms a passage from the pressure space to the storage space. The storage space and pressure space are divided into three chambers. A tubular piston having an axial bar projects from the bottom of the shell into the pressure chamber. Entry of the piston into the bore during downward movement of the plunger substantially closes the cylinder space of the pump constituted by the piston and the lower end of the plunger.

Masclet et al shows an olepneumatic suspension having a rod sealingly mounted for sliding movement inside a cylinder filled with hydraulic liquid. A guide rod fixed with respect to the bottom of the cylinder passes through a central passage provided in the piston. The piston also has two (2) valves with permanent throttle orifices of different cross-sections. The orifice of greater cross-section provides throttling in the compression phase and the orifice of smaller cross-section provides throttling in the extrusion phase.

Also of interest are U.S. Pat. Nos. 2,141,541 to Levv; 2,397,640 to Bingham; 2,823,915 to Bourcier De Carbon; 3,706,362 to Faure and 4,131,139 to Tanabe which show various types of valved orifices located in pistons of a cylinder to provide dampening to the cylinder.

There remains the need for a combination hydraulic and pneumatic cylinder for use in controlling the cornering ability of a vehicle which controls the rate of movement of the piston in the cylinder in two (2) ways. The cylinder uses a passageway through the piston rod to control the rate of extrusion and compression of the cylinder and a control valve in the piston to allow fluid flow between the chambers of the cylinder.

SUMMARY OF THE INVENTION

The present invention is a hydraulic and pneumatic cylinder for use on a vehicle to improve the handling of the vehicle in a turn or curve. The cylinder repositions the rear wheel of the vehicle in response to a change in the speed of the vehicle. The cylinder can be used on racing vehicles to allow for better handling of the vehicle in turns at high rates of speed. The cylinder has a body and a piston member. The body of the cylinder has opposed end caps with a cylinder bore extending therebetween. The piston member includes a piston and a piston rod. A divider wall extends across the cylindrical bore to divide the cylindrical bore into two chambers. The divider wall has a center opening to allow the piston rod to extend through and a side opening to allow fluid in the body to pass between the chambers. The first end cap has a guide pin which extends into a center bore in the piston. The center bore in the piston is in fluid communication with a center bore and side bore in the piston rod. The guide pin is smaller in diameter than the center bores of the piston and piston rod such that fluid is able to pass around the guide pin to move from one side of the piston to the other side of the piston. The piston is provided with a control valve having an adjustment cylinder and a valve mounted in a valve bore. An end of the valve pin extends beyond the valve bore and contacts the divider wall as the piston is moved toward the divider wall. Contact of the valve pin with the divider wall moves the valve to the fully open position. The control valve helps to provide a controlled rate of extension and compression of the cylinder. The cylinder is preferably mounted between a frame of the vehicle and a lower control arm for the rear, passenger wheel of the vehicle.

The cylinder extends and compresses in response to a change in the rate of speed of the vehicle. When the vehicle enters a turn and decelerates, the piston of the cylinder moves to the extended position. As the cylinder moves to the extended position, fluid on one side of the piston pushes against the valve pin of the control valve to open the control valve. When the cylinder is almost in the fully extended position with the piston adjacent the divider wall, the end of the valve pin contacts the divider wall and moves the control valve to the fully open position. When the vehicle exits the turn and accelerates, the piston of the cylinder moves to the compressed position. The cylinder allows the rear wheel on the passenger side of the vehicle to move backwards toward the rear end of the vehicle when the vehicle decelerates. Moving the rear wheel backwards allows for greater steering ability and better handling ability in turns at high speeds.

The present invention relates to a combined pneumatic and hydraulic cylinder, which comprises: a body having opposed open first and second ends with a bore extending therebetween defined by an inner sidewall around a longitudinal axis of the cylinder; a first end cap mounted on the open first end of the body and having a guide pin extending along the longitudinal axis of the cylinder and projecting into the bore; a divider wall mounted in the bore between the ends of the body and having a center opening around the longitudinal axis and a side opening extending parallel to and spaced apart from the longitudinal axis wherein the side opening allows for fluid flow through the divider wall; a second end cap mounted on the open second end of the body and having a center opening around the longitudinal axis; a piston member including a rod with a piston at one end wherein the piston member is mounted such that the rod sealingly extends through the center opening in the second end cap along the longitudinal axis with the piston slidably mounted in the bore between the first end cap and the divider wall with the piston in a sealed relationship with the inner wall of the body, the rod including: (i) a center bore along the longitudinal axis; and (ii) a side bore adjacent to the piston and in fluid communication with the center bore of the rod; the piston including: (i) a center bore along the longitudinal axis wherein the center bore of the piston is in fluid communication with the center bore and the side bore of the rod and wherein the guide pin of the first end cap extends into the center bore of the piston towards the rod; and (ii) a valve means which is opened when the piston is moving toward the divider wall; and a means mounted on the body for introducing a pneumatic fluid into the bore in the body between the second end cap and the divider wall, wherein the cylinder is mounted in a substantially horizontal orientation between objects which are in motion relative to each other and provides a controlled movement of at least one of the objects along the longitudinal axis of the cylinder by means of the guide pin which is undersized relative to the center bores of the piston and rod such that fluid is able to flow through the center bores around the guide pin and wherein the valve means in the piston equalizes hydraulic fluid pressure in the cylinder as the piston approaches the divider wall.

Further, the present invention relates to a combined pneumatic and hydraulic cylinder, which comprises: a body having opposed open first and second ends with a bore extending therebetween defined by an inner sidewall around a longitudinal axis of the cylinder; a first end cap mounted on the open first end of the body and having a guide pin extending along the longitudinal axis of the cylinder and projecting into the bore; a divider wall mounted in the bore between the ends of the body and having a center opening around the longitudinal axis and a side opening extending parallel to and spaced apart from the longitudinal axis wherein the side opening allows for fluid flow through the divider wall; a second end cap mounted on the open second end of the body and having a center opening around the longitudinal axis; a piston member having a rod with a piston at one end wherein the piston member is mounted such that the rod sealingly extends through the center opening in the second end cap along the longitudinal axis with the piston slidably mounted in the bore between the first end cap and the divider wall with the piston in a sealed relationship with the inner wall of the body, the rod including: (i) a center bore along the longitudinal axis; and (ii) a side bore adjacent to the piston and in fluid communication with the center bore of the rod; the piston including: (i) a center bore along the longitudinal axis wherein the center bore of the piston is in fluid communication with the center bore of the rod and the side bore of the rod and wherein the guide pin of the first end cap extends into the center bore towards the rod; and (ii) a valve means including a valve bore extending through the piston having opposed open ends and extending parallel to and spaced apart from the center bore with a valve pin and an adjustment means wherein when the valve means is in the closed position, an end of the valve pin extends through one of the ends of the valve bore on a side adjacent the rod and wherein the valve means is moved to a fully open position when the end of the valve pin contacts the divider wall as the piston approaches the divider wall; and a means mounted on the body for introducing a pneumatic fluid into the bore in the body between the second end cap and the divider wall, wherein the cylinder is mounted in a substantially horizontal orientation between objects which are in motion relative to each other and provides controlled movement of at least one of the objects along the longitudinal axis of the cylinder by means of the guide pin which is undersized relative to the center bore of the piston and rod such that fluid is able to flow through the center bores around the guide pin and wherein the valve means in the piston equalizes hydraulic fluid pressure in the cylinder as the piston approaches the divider wall.

Still further, the present invention relates to a vehicle having a frame and wheels and mounted on spindles, the improvement which comprises: a combined pneumatic and hydraulic cylinder mounted between the frame and at least one of the wheels, which includes: a body having opposed open first and second ends with a bore extending therebetween defined by an inner sidewall around a longitudinal axis of the cylinder; a first end cap mounted on the open first end of the body and having a guide pin extending along the longitudinal axis of the cylinder and projecting into the bore; a divider wall mounted in the bore between the ends of the body and having a center opening around the longitudinal axis and a side opening extending parallel to and spaced apart from the longitudinal axis wherein the side opening allows for fluid flow through the divider wall; a second end cap mounted on the open second end of the body and having a center opening around the longitudinal axis; a piston member including a rod with a piston at one end wherein the piston member is mounted such that the rod sealingly extends through the center opening in the second end cap along the longitudinal axis with the piston slidably mounted in the bore between the first end cap and the divider wall with the piston in a sealed relationship with the inner wall of the body, the rod including: (i) a center bore along the longitudinal axis; and (ii) a side bore adjacent to the piston and in fluid communication with the center bore of the rod; the piston including: (i) a center bore along the longitudinal axis wherein the center bore of the piston is in fluid communication with the center bore and the side bore of the rod and wherein the guide pin of the first end cap extends into the center bore of the piston towards the rod; and (ii) a valve means which is opened when the piston is immediately adjacent to the divider wall; and a means mounted on the body for introducing a pneumatic fluid into the bore in the body between the second end cap and the divider wall, wherein the cylinder is mounted in a substantially horizontal orientation between objects which are in motion relative to each other and provides controlled movement of at least one of the objects along the longitudinal axis of the cylinder by means of the guide pin which is undersized relative to the center bores of the piston and rod such that fluid is able to flow through the center bores around the guide pin and wherein the valve means in the piston equalizes hydraulic fluid pressure in the cylinder as the piston approaches the divider wall; wherein the cylinder is mounted such that when a rate of movement of the vehicle decreases, the piston member moves outward such as to expand the cylinder and wherein when a rate of movement of the vehicle increases, the piston member moves inward such as to compress the cylinder.

Further still, the present invention relates to a method for handling a vehicle in a turn at a high rate of speed, the vehicle having a frame with wheels mounted on spindles, the method which includes: providing a combined pneumatic and hydraulic cylinder which includes: a body having opposed open first and second ends with a bore extending therebetween defined by an inner sidewall around a longitudinal axis of the cylinder; a first end cap mounted on the open first end of the body and having a guide pin extending along the longitudinal axis of the cylinder and projecting into the bore; a divider wall mounted in the bore between the ends of the body and having a center opening around the longitudinal axis and a side opening extending parallel to and spaced apart from the longitudinal axis wherein the side opening allows for fluid flow through the divider wall; a second end cap mounted on the open second end of the body and having a center opening around the longitudinal axis; a piston member including a rod with a piston at one end wherein the piston member is mounted such that the rod sealingly extends through the center opening in the second end cap along the longitudinal axis with the piston slidably mounted in the bore between the first end cap and the divider wall with the piston in a sealed relationship with the inner wall of the body, the rod including: (i) a center bore along the longitudinal axis; and (ii) a side bore adjacent to the piston and in fluid communication with the center bore of the rod; the piston including: (i) a center bore along the longitudinal axis wherein the center bore of the piston is in fluid communication with the center bore and the side bore of the rod and wherein the guide pin of the first end cap extends into the center bore of the piston towards the rod; and (ii) a valve means which is opened when the piston is moved toward the divider wall; and a means mounted on the body for introducing a pneumatic fluid into the bore in the body between the second end cap and the divider wall, wherein the cylinder is mounted in a substantially horizontal orientation between objects which are in motion relative to each other and provides a controlled movement of at least one of the objects along the longitudinal axis of the cylinder by means of the guide pin which is undersized relative to the center bores of the piston and rod such that fluid is able to flow through the center bores around the guide pin and wherein the valve means in the piston equalizes hydraulic fluid pressure in the cylinder as the piston approaches the divider wall; mounting the cylinder between the frame of the vehicle and a rear control arm for one of the rear wheels of the vehicle; decreasing the rate of speed of the vehicle as the vehicle enters the turn so that the cylinder extends allowing one of the rear wheels connected to the rear control arm connected to the cylinder to move toward a rear end of the vehicle; and increasing the rate of speed of the vehicle as the vehicle exits the turn so that the cylinder compresses moving the rear wheel toward a front end of the vehicle.

The substance and advantages of the present invention will become increasingly apparent by reference to the following drawings and the description.

DESCRIPTION OF THE PREFERRED EMBODIMENTS

Figure 1:
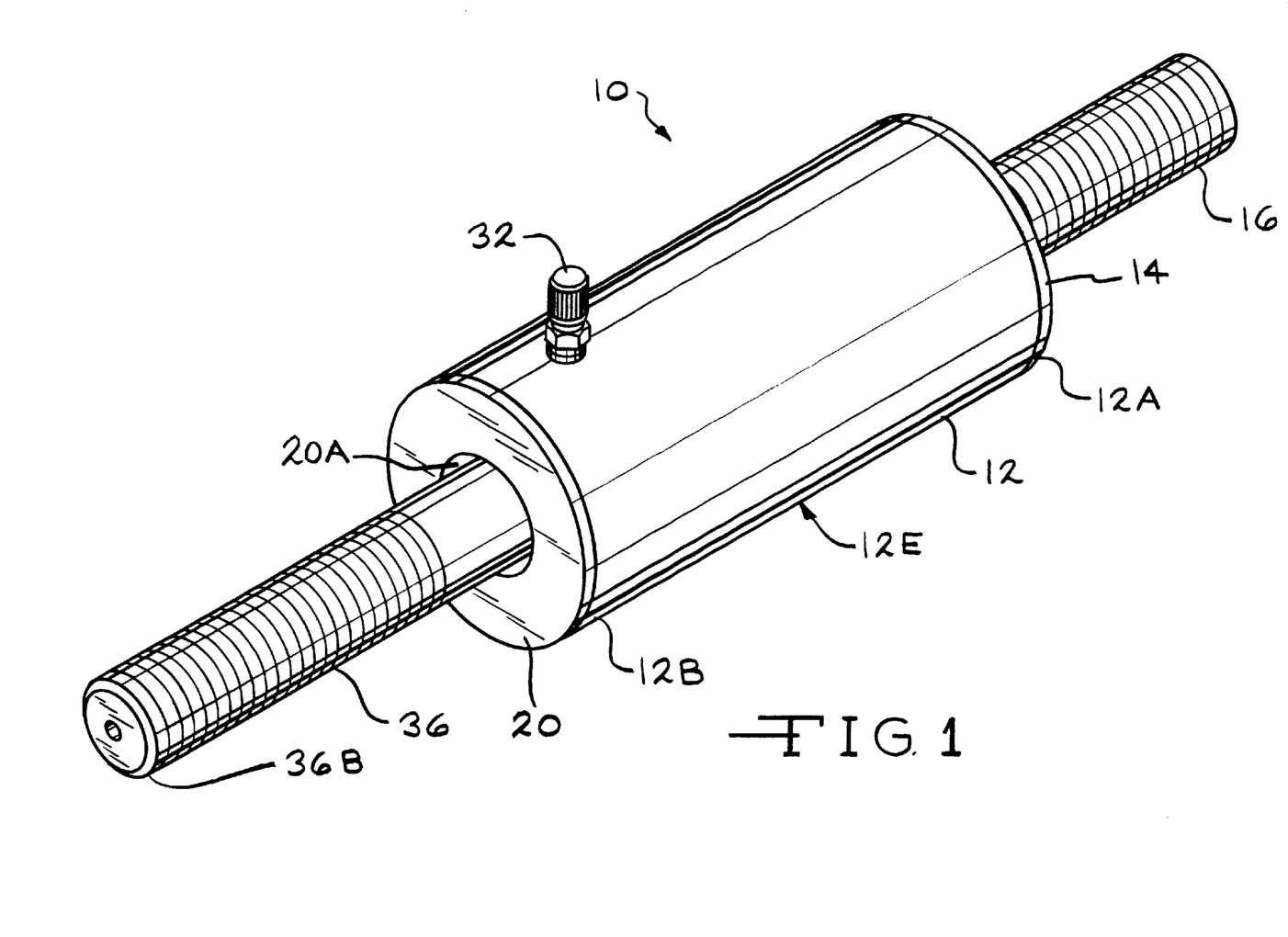
FIG. 1 is a perspective view of the cylinder 10 of the present invention.
Figure 2:
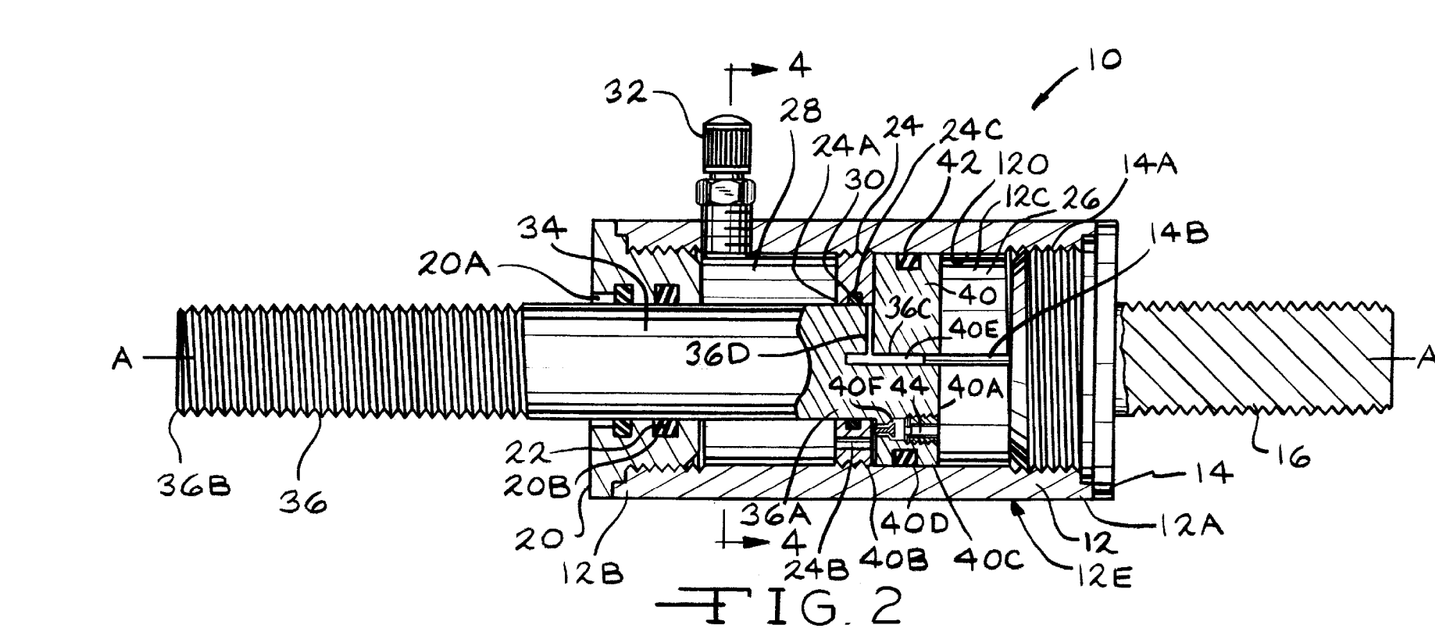
FIG. 2 is a cross-sectional view of the cylinder 10 showing the piston member 34 in the extended position.
Figure 3:
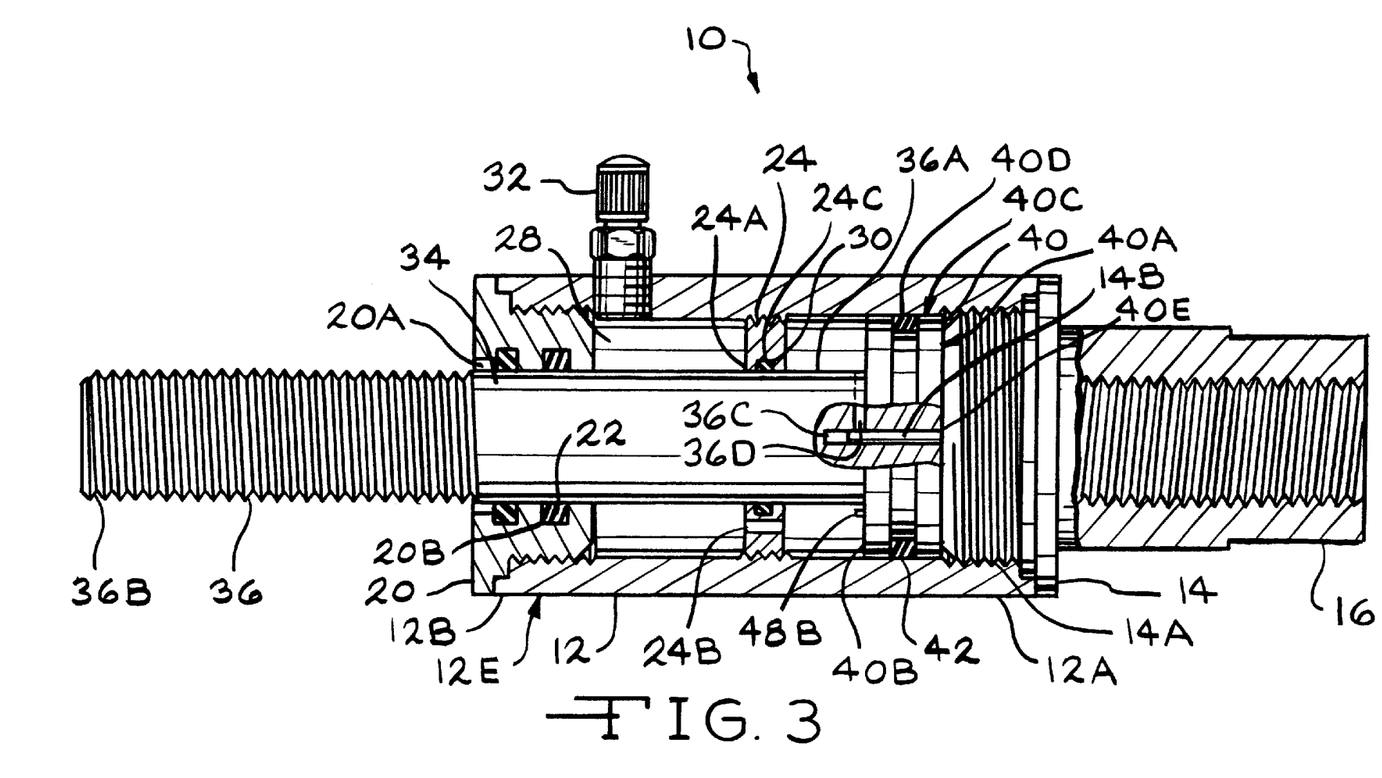
FIG. 3 is a cross-sectional view of the cylinder 10 showing the piston member 34 in the contracted position.

FIGS. 1 to 3 show the cylinder 10 of the present invention. The cylinder 10 includes a body 12 and a piston member 34. The body 12 has opposed open first and second ends 12A and 12B with a cylindrical bore 12C extending between the ends 12A and 12B. The ends 12A and 12B of the body 12 are closed by first and second end caps 14 and 20 which are preferably threadably mounted into the center bore 12C of the body 12 at each end. The end caps 14 and 20 can be secured on the body 12 by any well known means. In the preferred embodiment, the end caps 14 and 20 are removably mounted. However, it is understood that the end caps 14 and 20 could be permanently mounted to the body 12. One (1) of the end caps 14 or 20 could also be constructed as a unitary piece with the body 12. The first end cap 14 is mounted on the first end 12A of the body 12 and has a connecting rod 16 mounted perpendicular to the end cap 14 on one side of the end cap 14 opposite the cylindrical bore 12C of the body 12. Although a connecting rod 16 is shown, any connection means may be mounted on the cap 14 or body 12 to allow for connection of the cylinder 10 to the vehicle 100. The first end cap 14 has a threaded cylindrical portion 14A which extends into the center bore 12C of the body 12 and threadably mates into the center bore 12C of the body 12. A guide pin 14B is mounted on the threaded portion 14A and extends perpendicular to the threaded portion 14A into the center bore 12C of the body 12 (FIG. 2). The guide pin 14B is preferably coaxial with the longitudinal axis A—A of the cylinder 10. However, it is possible to position the guide pin 14B off-center as long as the guide pin 14B is parallel to the longitudinal axis A—A of the cylinder 10. The guide pin 14B preferably has a cylindrical shape. The second end cap 20 is threadably mounted on the open second end 12B of the body 12. The second end cap 20 has a center opening 20A through which the piston rod 36 for the piston member 34 extends. The center opening 20A is provided with concentric grooves 20B around the inner wall of the center opening 20A. Ring seals 22 are mounted in the grooves 20B and extend into center opening 20A. In the preferred embodiment, the diameter of the center opening 20A is slightly greater than the diameter of the piston rod 36 and the inner diameter of the ring seal 22 are less than the diameter of the center opening 20A such that the ring seals 22 contact the piston rod 36 and act to form seals between the piston rod 36 and the center opening 20A.

A divider wall 24 extends across the center bore 12C of the body 12 and divides the center bore 12C into a first chamber 26 and a second chamber 28. In the preferred embodiment, the divider wall 24 is threadably mounted in the center bore 12C of the body 12. However, the divider wall 24 can be mounted by any well known means. In addition, the divider wall 24 could also be constructed as a unitary piece with the body 12 of the cylinder 10. The divider wall 24 is positioned in the center bore 12C such that the first and second chambers 26 and 28 have substantially the same volume. The divider wall 24 includes a center opening 24A and a side opening 24B. The center opening 24A is in the center of the divider wall 24 and is coaxial with the longitudinal axis A—A of the cylinder 10. The inner wall 12D of the center opening 24A is provided with a groove 24C within which is positioned a ring seal 30. The center opening 24A of the divider wall 24 preferably has a diameter slightly greater than the diameter of the piston rod 36 of the piston member 34. The ring seal 30 preferably has an inner diameter less than the diameter of the center opening 24A such that the ring seal 30 extends into the center opening 24A and contacts the piston rod 36 and forms a seal between the piston rod 36 and the center opening 24A. The side opening 24B of the divider wall 24 is spaced apart from the center opening 24A and extends parallel to the longitudinal axis A—A of the cylinder 10. In the preferred embodiment, for a cylinder 10 having a body 12 with a length of about between 3.75 and 5.25 inches (9.53 and 13.34 cm) and a center bore 12C with a diameter of 1.5 inches (3.81 cm) the side opening 24B preferably has a diameter of 0.125 inches (0.13 cm).

An air inlet valve 32 extends through the sidewall 12E of the body 12 into the second chamber 28. The air inlet valve 32 preferably allows for inserting or injecting compressed air into the second chamber 28. The air inlet valve 32 is preferably a one-way valve such that air or other fluids can not leak from the second chamber 28 through the air inlet valve 32.

Figure 4:
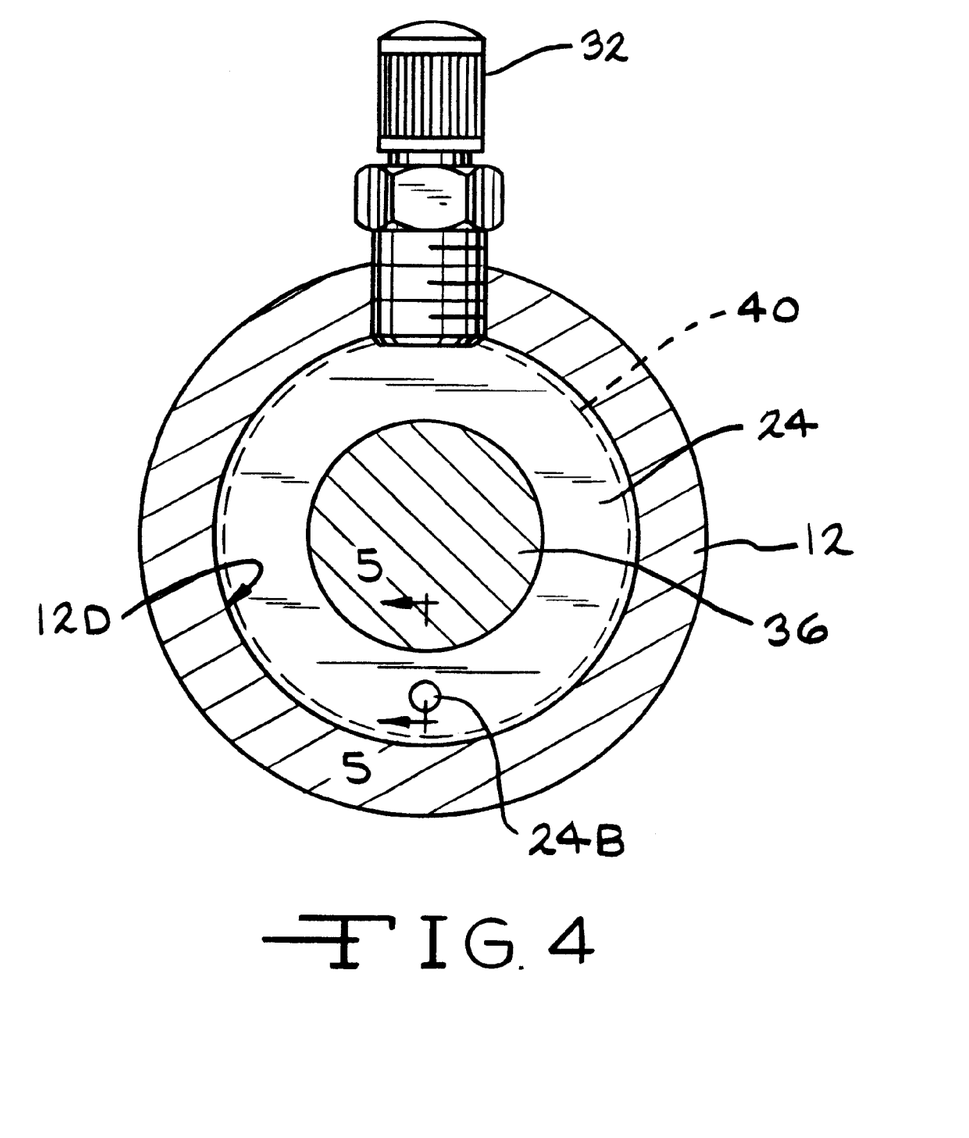
FIG. 4 is a cross-sectional view along the line 4—4 of FIG. 2 showing the side opening 24B of the divider wall 24.

The piston member 34 is slidably mounted in the center bore 12C of the body 12 and includes a piston rod 36 and a piston 40. The piston rod 36 and piston 40 can be constructed as a unitary piece or two (2) separate pieces. The piston member 34 is mounted in the center bore 12C of the body 12 such that the piston 40 is located in the first chamber 26 of the body 12 and the piston rod 36 extends from the piston 40 through the center opening 24A of the divider wall 24, through the second chamber 28 and through the center opening 20A of the second end cap 20. The piston member 34 is positioned such that the piston rod 36 extends coaxially with the longitudinal axis A—A of the cylinder 10. The piston rod 36 has a cylindrical shape with a first end 36A and a second end 36B. The piston rod 36 is mounted at the first end 36A on one end of the piston 40 perpendicular to the piston 40. The second end 36B of the piston rod 36 can be of any form such as to allow connection or mounting of the cylinder 10 to the vehicle 100. The first end 36A of the piston rod 36 is provided with a center bore 36C and a side bore 36D (FIG. 2). The center bore 36C of the piston rod 36 preferably extends only partially into the piston rod 36 adjacent the first end 36A of the piston rod 36 and has an open first end on the first end 36A of the piston rod 36. The side bore 36D extends into the piston rod 36 to the center bore 36C of the piston rod 36. In the preferred embodiment, the side bore 36D extends perpendicular to the center bore 36C. The open first end or exit of the side bore 36D of the piston rod 36 is preferably directly adjacent the piston 40. The second end of the side bore 36D intersects the center bore 36C such that the side bore 36D is in fluid communication with the center bore 36C. The side bore 36D preferably intersects the center bore 36C at a point spaced slightly apart from the closed, second end 36B of the center bore 36C. The piston 40 has a cylindrical shape with opposed ends 40A and 40B with a sidewall 40C extending therebetween. The outer diameter of the piston 40 is slightly less than the diameter of the center bore 12C of the body 12 (FIG. 4). The sidewall 40C of the piston 40 is provided with a groove 40D extending circumferentially around its perimeter spaced between the ends 40A and 40B of the piston 40. A ring seal 42 is mounted in the groove 40A and has an outer diameter equal to or slightly greater than the diameter of the center bore 12C of the body 12. The ring seal 42 creates a fluid seal between the piston 40 and the inner wall 12D of the body 12. The piston 40 includes a center bore 40E extending through the piston 40 between the ends 40A and 40B. The center bore 40E extends coaxial with the guide pin 14B and has a diameter slightly greater than the guide pin 14B such that the guide pin 14B can slide in the center bore 40E. The center bore 40E is in fluid communication with the center bore 36C of the piston rod 36. The center bore 36C of the piston rod 36, the center bore 40E of the piston 40 and the guide pin 14B are all coaxial. In the preferred embodiment, the length of the guide pin 14B is greater than the length of the center bore 40E of the piston 40 plus the length of the center bore 36C of the piston rod 36 up to and including the intersection of the side bore 36D with the center bore 36C such that when the cylinder 10 is in the fully extended position, the guide pin 14B extends into and completely through the center bore 40E of the piston 40 and into the center bore 36C of the piston rod 36 to the side bore 36D to prevent fluid communication between the side bore 36D and the center bore 36C of the piston rod 36 (FIG. 3). In the preferred embodiment, the center bore 40E of the piston 40 and the center bore 36C and side bore 36D of the piston rod 36 all have substantially the same diameter.

Figure 5:
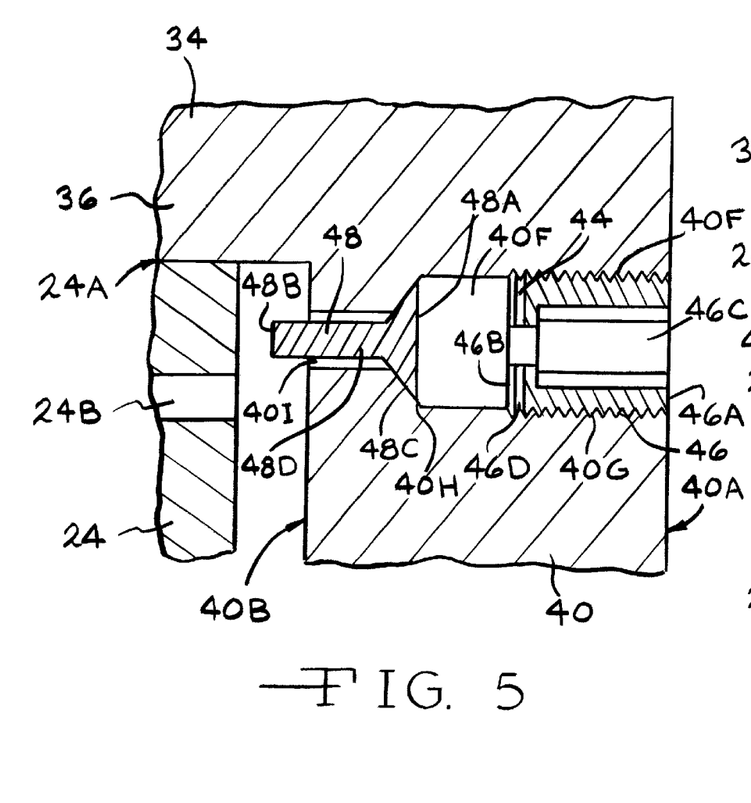
FIG. 5 is a cross-sectional view along the line 5—5 of FIG. 4 showing the control valve 44 in an open position with the valve pin 48 contacting the divider wall 24.
Figure 6:
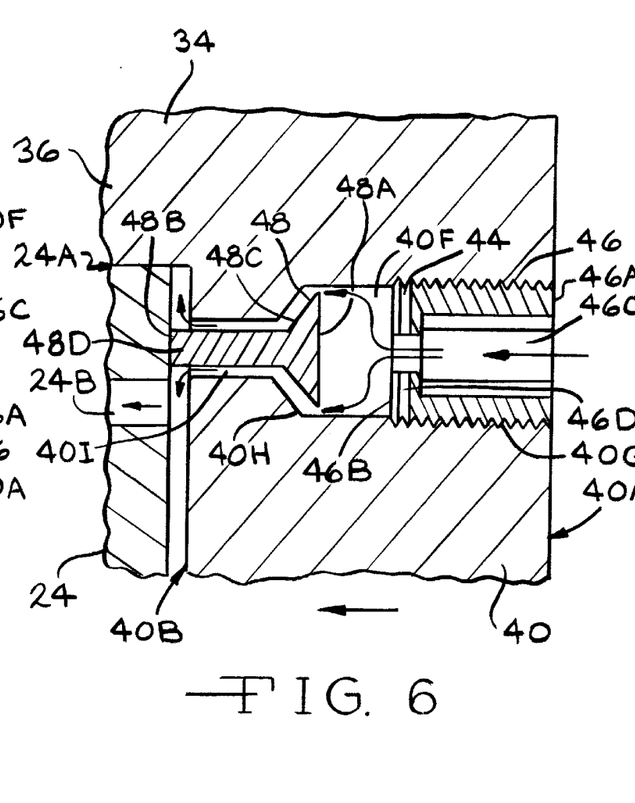
FIG. 6 is a cross-sectional view of the control valve 44 when the valve 44 is in the closed position.

A control valve 44 is provided in the piston 40 spaced apart from the center bore 40E. The control valve 44 is mounted in a valve bore 40F and includes an adjustment cylinder 46 and a valve pin 14B (FIGS. 5 and 6). The valve bore 40F extends through the piston 40 between the ends 40A and 40B of the piston 40 and is parallel to the center bore 40E of the piston 40. The valve bore 40F has a first portion 40G, a second portion 40H and a third portion 40I. A section of the first portion 40G of the valve bore 40F adjacent the first end 40A of the piston 40 is provided with threads. However in an alternative embodiment, the entire first portion 40G is threaded. The outer wall of the adjustment cylinder 46 has threads which mate with the threads of the first section of the first portion 40G of the side bore 36D and allow for adjustably mounting the adjustment cylinder 46 in the side bore 36D. The adjustment cylinder 46 has first and second ends 46A and 46B with a center bore 46C extending through the adjustment cylinder 46 between the ends 46A and 46B. The diameter of the center bore 46C of the adjustment cylinder 46 is preferably a 10.32 set screw. The center bore 46C of the adjustment cylinder 46 at the first end 46A has a shape and size such as to allow mounting of a wrench (not shown) to allow for insertion and removal and adjustment of the adjustment cylinder 46 in the valve bore 40F. The second end 46B of the adjustment cylinder 46 has grooves or slots 46D which allow for the flow of fluid from the center bore 46C of the adjustment cylinder 46 around the valve pin 14B when the first end of the valve pin 48 is in contact with the second 46B of the adjustment cylinder 46. The second portion 40H of the valve bore 40F preferably has a smooth inner wall. In the preferred embodiment, the diameter of the second portion 40H decreases gradually toward the third portion 40I such that the inner wall of the second portion 40H is angled inward adjacent the third portion 40I. The third portion 40I of the valve bore 40F preferably has a diameter smaller than the second portion 40H. In the preferred embodiment, the first portion 40G of the valve bore 40F has a diameter of about 0.081 inches (0.208 cm). The third portion 40I of the valve bore 40F preferably has a diameter of about 0.081 inches (0.208 cm). In the preferred embodiment, the first portion 40G of the valve bore 40F is about 0.159 inches (0.404 cm) in length. The second portion 40H is about 0.250 inches (0.635 cm) in length and the third portion 40I is about 0.187 inches (0.475 cm) in length.

The valve pin 48 is movably mounted in the valve bore 40F. The valve pin 48 has a first end 48A and a second end 48B. The valve pin 48 has a first portion 48C and a second portion 48D spaced between the first and second ends 48A and 48B. The valve pin 48 has a cross-sectional shape similar to the cross-sectional shape of the second and third portions 40H and 40I of the valve bore 40F. The first portion 48C of the valve pin 48 adjacent the first end 48A has a diameter slightly less than the diameter of the first portion 40G of the valve bore 40F. The second portion 48D of the valve pin 48 has a diameter less than the diameter of the third portion 40I of the valve bore 40F. The valve pin 48 is positioned in the valve bore 40F such that the first portion 48C of the valve pin 48 is located in the second portion 40H of the valve bore 40F and the second portion 48D of the valve pin 48 extends into the third portion 40I of the valve bore 40F. In the preferred embodiment, the length of the second portion 48D of the valve pin 48 is greater than the length of the third portion 40I of the valve bore 40F such that when the valve pin 48 is in the closed position, the second end 48B of the valve pin 48 extends beyond the valve bore 40F and the piston 40 and the first portion 48C of the valve pin 48 is preferably in contact with the second portion 40H of the valve bore 40F.

IN USE

Figure 7:
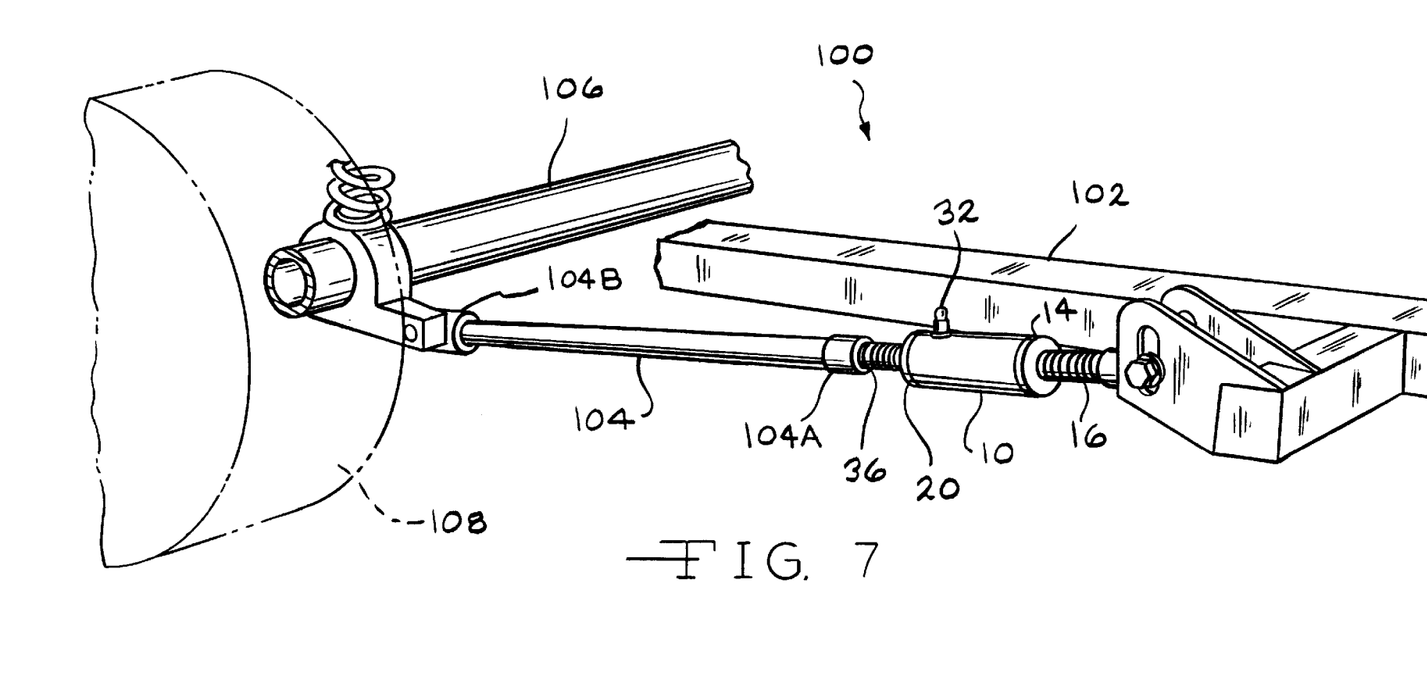
FIG. 7 is a schematic view of the cylinder 10 mounted between the frame 102 of a vehicle 100 and the rear control arm 104 of the vehicle 100.

The cylinder 10 is preferably used in a substantially horizontal position to assist in the cornering ability of a vehicle (not shown) at high rates of speed. The cylinder 10 is preferably used on high performance race cars. The cylinder 10 is preferably connected to the rear or lower control arm 104 for a rear axle 106 of the vehicle 100 (FIG. 7). The cylinder 10 is preferably mounted to the control arm 104 for the rear, passenger side wheel 108. In the preferred embodiment, the cylinder 10 is mounted between a first end 104A of the rear control arm 104 and the frame 102 of the vehicle 100. Preferably, the second end 36B of the piston rod 36 of the cylinder 10 is connected to the first end 104A of the control arm 104. The second end 104B of the control arm 104 is connected to the axle 106 of the vehicle 100 similarly to the standard connection of the rear control arm 104 to the rear axle 106 of the vehicle 100. In the preferred embodiment, only one (1) cylinder 10 is used per vehicle 100. The cylinder 10 allows the rear axle 106 and wheel 108 to move relative to the front and rear ends of the vehicle 100. In the preferred embodiment, the axle 106 and wheel 108 are able to move between about 0.0 inch and 1.0 inch (0.0 cm and 2.54 cm) toward the rear end of the vehicle 100 when the cylinder 10 is in the fully extended position. In the preferred embodiment, the cylinder 10 compresses when the driver accelerates and extends when the driver brakes. Thus, as a driver enters a turn, the driver brakes and the vehicle 100 decelerates in response, the cylinder 10 extends allowing the rear axle 106 and wheel 108 on the passenger side of the vehicle 100 to move backwards toward the rear end of the vehicle 100. As the vehicle 100 exits the turn, the driver pushes on the accelerator and the vehicle accelerates which causes the cylinder 10 to compress and move the rear axle 106 and wheel 108 back to the standard position. In the preferred embodiment, the cylinder 10 extends at a faster rate than it collapses due to the fact that there is less force acting on the cylinder 10 when the cylinder 10 is moving to the collapsed position. In addition, preferably more force is required to compress the cylinder 10 than to extend the cylinder 10. In the preferred embodiment, the cylinder 10 compresses at a predetermined rate. In the preferred embodiment, when the vehicle 100 is traveling at about 70 mph, the cylinder 10 compresses in about 0.25 seconds or less from the time the driver begins to accelerate. Preferably, the driver of the vehicle 100 does not feel the extension or compression of the cylinder 10.

Preferably, the cylinder 10 is fully constructed and filled with fluid prior to mounting on the vehicle 100. The type of fluid used in the cylinder 10 will effect the rate of compression and extension of the cylinder 10. In the preferred embodiment, 10 weight synthetic shock oil is used. Compressed gas is added to the fluid in the second chamber 28 using the air inlet valve 32 to prevent the fluid from foaming during use. When constructed, the piston 40 of the piston member 34 is located in the first chamber 26 with the guide pin 14B extending into the center bore 40E of the piston 40. The piston rod 36 extends through the center opening 24A of the divider wall 24 and the center opening 20A of the second end cap 20.

In the fully extended position, the piston 40 of the piston member 34 is in contact with the divider wall 24 and the control valve 44 is in the fully open position. In the fully contracted position, the piston 40 is in contact with the first end cap 14 and the control valve 44 is in the closed position. As the piston member 34 moves from the fully extended position to the fully compressed position and the cylinder 10 is compressed, the piston 40 moves away from the divider wall 24 toward the first end cap 14. As the piston member 34 moves, the fluid (oil and compressed air) in the first chamber 26 move from one side of the piston 40 to the other side of the piston 40. The fluid moves through the center bore 40E of the piston 40 around the guide pin 14B. The difference in the diameters of the guide pin 14B and the center bore 40E allow the fluid to move through the center bore 40E around the guide pin 14B and into the center bore 36C and side bore 36D of the piston rod 36. When the cylinder 10 is in the fully contracted position, the guide pin 14B preferably extends beyond the intersection of the side bore 36D and the center bore 36C of the piston rod 36 and completely closes off the side bore 36D stopping the flow of fluid into the first chamber 26 from the side bore 36D. In addition, as the piston member 34 moves, the fluid enters the center bore 46C of the adjustment cylinder 46 of the control valve 44. The flow of fluid into the center bore 46C contacts the first end 48A of the valve pin 48 and moves the valve pin 48 into a closed position such that the first portion 48C of the valve pin 48 is in contact with the second portion 40H of the valve bore 40F such that the valve pin 48 closes the valve bore 40F preventing fluid from flowing through the valve bore 40F. During compression of the cylinder 10, a minimal amount of fluid may also flow from the first chamber 26 into the second chamber 28 through the side opening 24B in the divider wall 24. The side opening 24B in the divider wall 24 allows for the flow of fluid from the first chamber 26 to the second chamber 28 as needed to equalize the pressure in the two (2) chambers 26 and 28.

As the cylinder 10 extends and moves from the fully compressed position to the fully extended position, the fluid in the lower portion of the first chamber 26 is compressed and is forced through the valve bore 40F for the control valve 44. The force of the fluid in the first chamber 26 pushes against the second end 48B of the valve pin 48 of the control valve 44 and acts to move the valve pin 48 to an open or semi-open position. In the preferred embodiment, the force of the fluid pushing against the second end 48B of the valve pin 48 does not fully open the valve 44. When the piston 40 approaches the divider wall 24, the second end 48B of the valve pin 48 contacts the divider wall 24 which moves the valve pin 48 into the completely open position and allows the piston 40 to move to the fully extended position. The adjustment cylinder 46 allows for adjusting the amount of distance the valve pin 48 is able to retract into the valve bore 40F. In the preferred embodiment, the adjustment cylinder 46 is positioned such that the valve pin 48 is able to fully retract into the valve bore 40F while the second end 48B of the valve pin 48 remains in the third portion 40I of the valve bore 40F such as to guide the valve pin 48 when the valve pin 48 is moving to the closed position. The control valve 44 allows for faster extension of the cylinder 10. The grooves 46D in the second end 46B of the adjustment cylinder 46 allow fluid to flow through the valve bore 40F when the valve pin 48 is in the fully open position which increases the extension speed of the cylinder 10. During expansion of the cylinder 10, the fluid also moves into the side bore 36D and center bore 36C of the piston rod 36 and through the center bore 40E of the piston 40. Positioning the open first end of the side bore 36D directly adjacent the piston 40 allows fluid to continue to flow through the side bore 36 and the center bores 36D and 40E until the cylinder 10 is in the fully extended position.

It is intended that the foregoing description be only illustrative of the present invention and that the present invention be limited only by the hereinafter appended claims.

I claim:

1. A combined pneumatic and hydraulic cylinder, which comprises:
    (a) a body having opposed open first and second ends with a bore extending therebetween defined by an inner sidewall around a longitudinal axis;
    (b) a first end cap mounted on the open first end of the body and having a guide pin extending along the longitudinal axis and projecting into the bore;
    (c) a divider wall mounted in the bore between the ends of the body and having a center opening around the longitudinal axis and a side opening extending parallel to and spaced apart from the longitudinal axis wherein the side opening allows for fluid flow through the divider wall;
    (d) a second end cap mounted on the open second end of the body and having a center opening around the longitudinal axis;
    (e) a piston member including a rod with a piston at one end wherein the piston member is mounted such that the rod sealingly extends through the center opening in the second end cap along the longitudinal axis with the piston slidably mounted in the bore between the first end cap and the divider wall with the piston in a sealed relationship with the inner wall of the body, the rod including:
        (i) a center bore along the longitudinal axis; and
        (ii) a side bore adjacent to the piston and in fluid communication with the center bore of the rod;
    the piston including:
        (i) a center bore along the longitudinal axis wherein the center bore of the piston is in fluid communication with the center bore and the side bore of the rod and wherein the guide pin of the first end cap extends into the center bore of the piston towards the rod; and
        (ii) a valve means which is opened when the piston is moving toward the divider wall; and
    (f) a means mounted on the body for introducing a pneumatic fluid into the bore in the body between the second end cap and the divider wall, wherein the cylinder is mounted in a substantially horizontal orientation between objects which are in motion relative to each other and provides a controlled movement of at least one of the objects along the longitudinal axis by means of the guide pin which is undersized relative to the center bores of the piston and rod such that fluid is able to flow through the center bores around the guide pin and wherein the valve means in the piston equalizes hydraulic fluid pressure in the cylinder as the piston approaches the divider wall.

2. The cylinder of claim 1 wherein the valve means of the piston member of the cylinder includes a bore extending through the piston having opposed open ends and extending parallel to and spaced apart from the center bore of the piston with a valve pin and an adjustment means wherein when the valve means is in the closed position, an end of the valve pin extends through one of the ends of the side bore on a side adjacent the rod wherein the valve means is moved to a fully open position when the end of the valve pin contacts the divider wall as the piston approaches the divider wall.

3. The cylinder of claim 2 wherein the bore of the valve means of the piston has a first, second and third portion with the second portion located between the first and third portions wherein a diameter of the first portion is greater than a diameter of the third portion and wherein a diameter of the second portion decreases along a length of the second portion from the first portion to the third portion.

4. The cylinder of claim 3 wherein the valve pin has a first, second and third portion with the second portion located between the first and third portions, wherein a diameter of the first portion is greater than a diameter of the third portion, wherein a diameter of the second portion decreases along a length of the second portion from the first portion to the third portion and wherein when the valve means is in the closed position, the second portion of the valve pin is in contact with the second portion of the bore.

5. The cylinder of claim 4 wherein the diameter of the third portion of the center bore is about 0.092 inches (0.234 cm) greater than the diameter of the third portion of the valve pin.

6. The cylinder of claim 2 wherein the adjustment means is a threaded cylinder having a center bore.

7. The cylinder of claim 6 wherein the bore has threads which threadably engage threads of the threaded cylinder so that a depth of the threaded cylinder in the bore of the valve means is adjustable to adjust the location of the valve pin in the bore.

8. The cylinder of claim 7 wherein an end of the center bore of the threaded cylinder opposite the valve pin has a wrench opening to allow for adjustment of the threaded cylinder using a wrench.

9. The cylinder of claim 6 wherein an end of the threaded cylinder adjacent the valve pin is provided with grooves which extend from a perimeter of the threaded cylinder to the center bore so that when the valve pin is in contact with the end of the threaded cylinder, fluid is able to flow through the center bore of the threaded cylinder through the grooves to the bore of the valve means.

10. The cylinder of claim 2 wherein the end of the valve pin extends beyond the piston about 0.045 inches (0.114 cm) such that the valve pin contacts the divider wall and moves the valve means to the open position when the piston is about 0.045 inches (0.114 cm) from the divider wall.

11. The cylinder of claim 1 wherein a total distance of travel of the piston member in the center bore is 0.5 inches (1.27 cm).

12. The cylinder of claim 1 wherein an open end of the side bore of the rod is in contact with the piston.

13. The cylinder of claim 1 wherein the side bore of the rod is perpendicular to the center bore of the rod.

14. The cylinder of claim 1 wherein a diameter of the center bore of the piston is about 0.008 inches (0.020 cm) greater than a diameter of the guide pin of the first end cap such that fluid is able to flow through the center bore around the guide pin.

15. The cylinder of claim 1 wherein the guide pin is of such a length that when the cylinder is in the fully extended position with the piston in contact with the divider wall, the guide pin extends into the center bore of the piston.

16. The cylinder of claim 1 wherein when the cylinder is in the fully compressed position, the guide pin is of such a length as to extend completely through the piston and into the center bore of the rod and beyond an end of the side bore of the rod so as to prevent fluid from flowing between the side bore of the rod and the center bore of the rod.

17. The cylinder of claim 1 wherein the bore of the body contains compressed air and another fluid.

18. A combined pneumatic and hydraulic cylinder, which comprises:
(a) a body having opposed open first and second ends with a bore extending therebetween defined by an inner sidewall around a longitudinal axis;
(b) a first end cap mounted on the open first end of the body and having a guide pin extending along the longitudinal axis projecting into the bore;
(c) a divider wall mounted in the bore between the ends of the body and having a center opening around the longitudinal axis and a side opening extending parallel to and spaced apart from the longitudinal axis wherein the side opening allows for fluid flow through the divider wall;
(d) a second end cap mounted on the open second end of the body and having a center opening around the longitudinal axis;
(e) a piston member having a rod with a piston at one end wherein the piston member is mounted such that the rod sealingly extends through the center opening in the second end cap along the longitudinal axis with the piston slidably mounted in the bore between the first end cap and the divider wall with the piston in a sealed relationship with the inner wall of the body, the rod including:
(i) a center bore along the longitudinal axis; and
(ii) a side bore adjacent to the piston and in fluid communication with the center bore of the rod;
the piston including:
(i) a center bore along the longitudinal axis wherein the center bore of the piston is in fluid communication with the center bore of the rod and the side bore of the rod and wherein the guide pin of the first end cap extends into the center bore towards the rod; and
(ii) a valve means including a valve bore extending through the piston having opposed open ends and extending parallel to and spaced apart from the center bore with a valve pin and an adjustment means wherein when the valve means is in the closed position, an end of the valve pin extends through one of the ends of the valve bore on a side adjacent the rod and wherein the valve means is moved to a fully open position when the end of the valve pin contacts the divider wall as the piston approaches the divider wall; and
(f) a means mounted on the body for introducing a pneumatic fluid into the bore in the body between the second end cap and the divider wall, wherein the cylinder is mounted in a substantially horizontal orientation between objects which are in motion relative to each other and provides controlled movement of at least one of the objects along the longitudinal axis of the cylinder by means of the guide pin which is undersized relative to the center bore of the piston and rod such that fluid is able to flow through the center bores around the guide pin and wherein the valve means in the piston equalizes hydraulic fluid pressure in the cylinder as the piston approaches the divider wall.

19. The cylinder of claim 18 wherein the valve bore of the valve means of the piston has a first, second and third portion with the second portion located between the first and third portions wherein a diameter of the first portion is greater than a diameter of the third portion and wherein a diameter of the second portion decreases along a length of the second portion from the first portion to the third portion.

20. The cylinder of claim 19 wherein the valve pin has a first, second and third portion with the second portion located between the first and third portions, wherein a diameter of the first portion is greater than a diameter of the third portion wherein a diameter of the second portion decreases along a length of the second portion from the first portion to the third portion and wherein when the valve means is in the closed position, the second portion of the valve pin is in contact with the second portion of the valve bore to close the valve means.

21. The cylinder of claim 18 wherein the adjustment means is a threaded cylinder having a center bore.

22. The cylinder of claim 21 wherein the valve bore has threads which threadably engage threads of the threaded cylinder so that a depth of the threaded cylinder in the valve bore of the valve means is adjustable to adjust the location of the valve pin in the valve bore.

23. The cylinder of claim 22 wherein an end of the center bore of the threaded cylinder opposite the valve pin has a wrench opening to allow for adjustment of the cylinder using a wrench.

24. The cylinder of claim 21 wherein an end of the threaded cylinder adjacent the valve pin is provided with grooves which extend from a perimeter of the threaded cylinder to the center bore so that when the valve pin is in contact with the end, fluid is able to flow through the center bore of the threaded cylinder through the grooves to the valve bore of the valve means.

25. The cylinder of claim 18 wherein the end of the valve pin extends beyond the piston about 0.045 inches (0.114 cm) such that the valve pin contacts the divider wall and moves the valve means to the open position when the piston is about 0.045 inches (0.114 cm) from the divider wall.

26. The cylinder of claim 18 wherein an open end of the side bore of the rod is in contact with the piston.

27. The cylinder of claim 18 wherein the side bore of the rod is perpendicular to the center bore of the rod.

28. The cylinder of claim 18 wherein the guide pin is of such a length that when the cylinder is in the fully extended position with the piston in contact with the divider wall, the guide pin extends into the center bore of the piston.

29. The cylinder of claim 18 wherein when the cylinder is in the fully compressed position, the guide pin is of such a length as to extend completely through the piston and into the center bore of the rod and beyond an end of the side bore of the rod so as to prevent fluid from flowing between the side bore of the rod and the center bore of the rod.

30. A vehicle having a frame and wheels and mounted on spindles, the improvement which comprises:
a combined pneumatic and hydraulic cylinder mounted between the frame and at least one of the wheels, which includes:
(a) a body having opposed open first and second ends with a bore extending therebetween defined by an inner sidewall around a longitudinal axis;

(b) a first end cap mounted on the open first end of the body and having a guide pin extending along the longitudinal axis and projecting into the bore;

(c) a divider wall mounted in the bore between the ends of the body and having a center opening around the longitudinal axis and a side opening extending parallel to and spaced apart from the longitudinal axis wherein the side opening allows for fluid flow through the divider wall;

(d) a second end cap mounted on the open second end of the body and having a center opening around the longitudinal axis;

(e) a piston member including a rod with a piston at one end wherein the piston member is mounted such that the rod sealingly extends through the center opening in the second end cap along the longitudinal axis with the piston slidably mounted in the bore between the first end cap and the divider wall with the piston in a sealed relationship with the inner wall of the body, the rod including:

(i) a center bore along the longitudinal axis; and

(ii) a side bore adjacent to the piston and in fluid communication with the center bore of the rod;

the piston including:

(i) a center bore along the longitudinal axis wherein the center bore of the piston is in fluid communication with the center bore and the side bore of the rod and wherein the guide pin of the first end cap extends into the center bore of the piston towards the rod; and    (ii) a valve means which is opened when the piston is immediately adjacent to the divider wall; and (f) a means mounted on the body for introducing a pneumatic fluid into the bore in the body between the second end cap and the divider wall, wherein the cylinder is mounted in a substantially horizontal orientation between objects which are in motion relative to each other and provides controlled movement of at least one of the objects along the longitudinal axis by means of the guide pin which is undersized relative to the center bores of the piston and rod such that fluid is able to flow through the center bores around the guide pin and wherein the valve means in the piston equalizes hydraulic fluid pressure in the cylinder as the piston approaches the divider wall; wherein the cylinder is mounted such that when a rate of movement of the vehicle decreases, the piston member moves outward such as to expand the cylinder and wherein when a rate of movement of the vehicle increases, the piston member moves inward such as to compress the cylinder.

31. The vehicle of claim 30 wherein the cylinder is mounted on a rear of the vehicle opposite a position of the steering wheel.

32. A method for handling a vehicle in a turn at a high rate of speed, the vehicle having a frame with wheels mounted on spindles, the method which includes:

(a) providing a combined pneumatic and hydraulic cylinder which includes: a body having opposed open first and second ends with a bore extending therebetween defined by an inner sidewall around a longitudinal axis; a first end cap mounted on the open first end of the body and having a guide pin extending along the longitudinal axis and projecting into the bore; a divider wall mounted in the bore between the ends of the body and having a center opening around the longitudinal axis and a side opening extending parallel to and spaced apart from the longitudinal axis wherein the side opening allows for fluid flow through the divider wall; a second end cap mounted on the open second end of the body and having a center opening around the longitudinal axis; a piston member including a rod with a piston at one end wherein the piston member is mounted such that the rod sealingly extends through the center opening in the second end cap along the longitudinal axis with the piston slidably mounted in the bore between the first end cap and the divider wall with the piston in a sealed relationship with the inner wall of the body, the rod including: (i) a center bore along the longitudinal axis; and (ii) a side bore adjacent to the piston and in fluid communication with the center bore of the rod; the piston including: (i) a center bore along the longitudinal axis wherein the center bore of the piston is in fluid communication with the center bore and the side bore of the rod and wherein the guide pin of the first end cap extends into the center bore of the piston towards the rod; and (ii) a valve means which is opened when the piston is moved toward the divider wall; and a means mounted on the body for introducing a pneumatic fluid into the bore in the body between the second end cap and the divider wall, wherein the cylinder is mounted in a substantially horizontal orientation between objects which are in motion relative to each other and provides a controlled movement of at least one of the objects along the longitudinal axis of by means of the guide pin which is undersized relative to the center bores of the piston and rod such that fluid is able to flow through the center bores around the guide pin and wherein the valve means in the piston equalizes hydraulic fluid pressure in the cylinder as the piston approaches the divider wall;

(b) mounting the cylinder between the frame of the vehicle and a rear control arm for one of the rear wheels of the vehicle;

(c) decreasing the rate of speed of the vehicle as the vehicle enters the turn so that the cylinder extends allowing one of the rear wheels connected to the rear control arm connected to the cylinder to move toward a rear end of the vehicle; and (d) increasing the rate of speed of the vehicle as the vehicle exits the turn so that the cylinder compresses moving the rear wheel toward a front end of the vehicle.

* * * * *